United States Patent [19]

Crocker

[11] Patent Number: 5,761,106
[45] Date of Patent: Jun. 2, 1998

[54] HORIZONTALLY PIPELINED MULTIPLIER CIRCUIT

[75] Inventor: Paul R. Crocker, Austin, Tex.

[73] Assignee: Motorola, Inc., Schaumburg, Ill.

[21] Appl. No.: 669,075

[22] Filed: Jun. 24, 1996

[51] Int. Cl.[6] ............................................. G06F 7/52
[52] U.S. Cl. ........................... 364/760.04; 364/760.03
[58] Field of Search ................................ 364/754, 757, 364/759, 760, 760.01, 760.04

[56] References Cited

U.S. PATENT DOCUMENTS

| | | | |
|---|---|---|---|
| 4,575,812 | 3/1986 | Kloker et al. | 364/760 |
| 4,825,401 | 4/1989 | Ikumi | 364/760 |

Primary Examiner—Tan V. Mai

[57] ABSTRACT

A multiplier circuit (300, 400, 500, 600) uses a horizontal pipelining of the circuitry (301, 401, 501, 601) in order to reduce the number of gate-drain delays within the various data paths through the array (301, 401, 501, 601). Additionally, a combination of vertical and horizontal pipelining (550, 650) may also be implemented. The multiplier circuit (400, 600) may implement a modified Booth's algorithm. A horizontal pipeline latch (350, 450, 550, 650) operates to divide the array (301, 401, 501, 601) into two portions, where the first portion (360, 460, 560, 660) operates on the least significant bits of the resulting product, while the second portion (361, 461, 561, 661) operates on the most significant bits of that product.

20 Claims, 7 Drawing Sheets

FIG.1 —PRIOR ART—

HORIZONTALLY PIPELINED MULTIPLIER CIRCUIT

FIELD OF THE INVENTION

The present invention relates in general to multiplier circuits, and in particular, to a multiply-accumulate circuit.

BACKGROUND OF THE INVENTION

Multiply or multiply-accumulate ("MAC") circuits are an integral part of all digital signal processors ("DSPs") and many microprocessors and microcontrollers. These circuits are logically complex, and even after many generations of optimization contain many long propagation delay paths from input to output. These paths often become the critical delay path of the entire DSP or microprocessor.

In many cases, the critical feature of a multiplier circuit is that it complete one multiply operation on each clock cycle. Therefore, it is important that the multiplier circuit not cause too much delay resulting in a slower clock speed. The fact that the output of the multiplier circuit is delayed by one clock cycle is of no consequence as long as there is an output on each clock cycle. This makes the multiplier circuit amenable to pipelining.

This problem can be more readily seen by referring to FIG. 1, which illustrates MAC 100 implementing a modified Booth's algorithm. MAC 100 includes X-input latch 102 and Y-input latch 103. Latches 102 and 103 receive from external circuitry (not shown) two operands (hereinafter also referred to as the multiplicand and the multiplier), which are to be multiplied by each other and simultaneously added to the previous result to produce an accumulating product, which is eventually produced and stored within result latch 106. The previous result is input to array 101 via feedback loop 120. Latches 102 and 103 may be of any size, for example, MAC 100 may be operable to multiply two 16-bit operands, or operands of different bit lengths.

Coupled to Y-input latch 103 is recoder circuit 104, which is typically a part of a MAC implementing a modified Booth's algorithm.

The outputs of X-input latch 102 and recoder 104 are entered into multiplexer/adder array 101, which is also comprised of conventional combinational logic circuitry implemented within MACs. Array 101 is shown as a non-rectangular parallelogram, which depicts the general shape of the circuitry when horizontal and vertical data flow through array 101 has been aligned to an orthogonal axis.

The output from array 101 is entered into accumulator 105, which performs the final addition of the partial products of the Booth's algorithm and of the previously accumulated result. Such a chain of multiply-accumulate operations may be depicted as: (x1*y1)+(x2*y2)+(x3*y3) .... An example of a typical MAC and the various elements within a MAC are described in U.S. Pat. No. 4,575,812, issued Mar. 11, 1986 to Kloker, et al., which is hereby incorporated by reference herein.

As an example of the usage of a MAC within a DSP, each of the "x" values may represent a data sample, while each of the "y" values may represent a coefficient of an impulse response as a signal is passed through a filter.

Dashed line 190 represents the direction of travel of output bits through array 101. Dashed line 192 represents the direction of travel of the output values from recoder 104 through array 101. And, dashed line 191 generally represents the direction of travel of the X-input bits and the carry-save values through array 101.

Latches 102, 103, and 106 set the bounds on the propagation delay through combinational logic block 150. Several examples of critical signal paths of this delay are represented by the heavy lines 110–112 originating at the top of Y-input latch 103 to the far left portion of result latch 106. A signal path comprises all the circuitry in combinational logic block 150 through which a particular signal "travels." Signal paths 110–112 include a number of gate-drain delays of transistors during operation of combinational logic block 150. Paths 110 and 112, plus many more that can be envisioned between these two, are roughly equal in delay. Optimizing one signal path, such as path 111 will then necessitate the need to optimize another path, such as path 110. The problem is that any one path through combinational logic block 150 cannot be optimized at the expense of another.

As noted above, the goal is for the operation of combinational logic block 150 to occur in one clock cycle. The faster the throughput of the data through combinational logic block 150 (the less the number of gate drain delays), the faster the clock that can be utilized to operate MAC 100, and correspondingly, the faster the clock that may be used to time the operation of the microprocessor, microcontroller, or DSP embodying MAC 100.

One way to solve the foregoing problem and reduce the amount of delay caused by the gate-drain delays within the circuitry combinational logic block 150 is to pipeline the functions of MAC 100. When such a prior art circuit as MAC 100 is pipelined, it is typically done by putting a latch at the output of recoder 104, placing a latch circuit between array 101 and final adder/accumulator 105, or both. However, it is obvious by viewing MAC 100 that neither of these is an optimum location for such a pipeline latch. An optimum location would be at approximately the halfway point of all the parallel signal paths in combinational logic block 150. This would be a diagonal line from the upper left of FIG. 1 to the lower middle. However, a diagonal break for such a pipeline is not feasible because the accumulator result must be delayed by only one clock before it is fed back by feedback path 120 to the input of array 101, and such a diagonal break would not permit this.

Thus, there is a need in the art for a multiplier circuit where the gate-drain delays through the multiplexer, adder array within the multiplier circuit are minimized.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
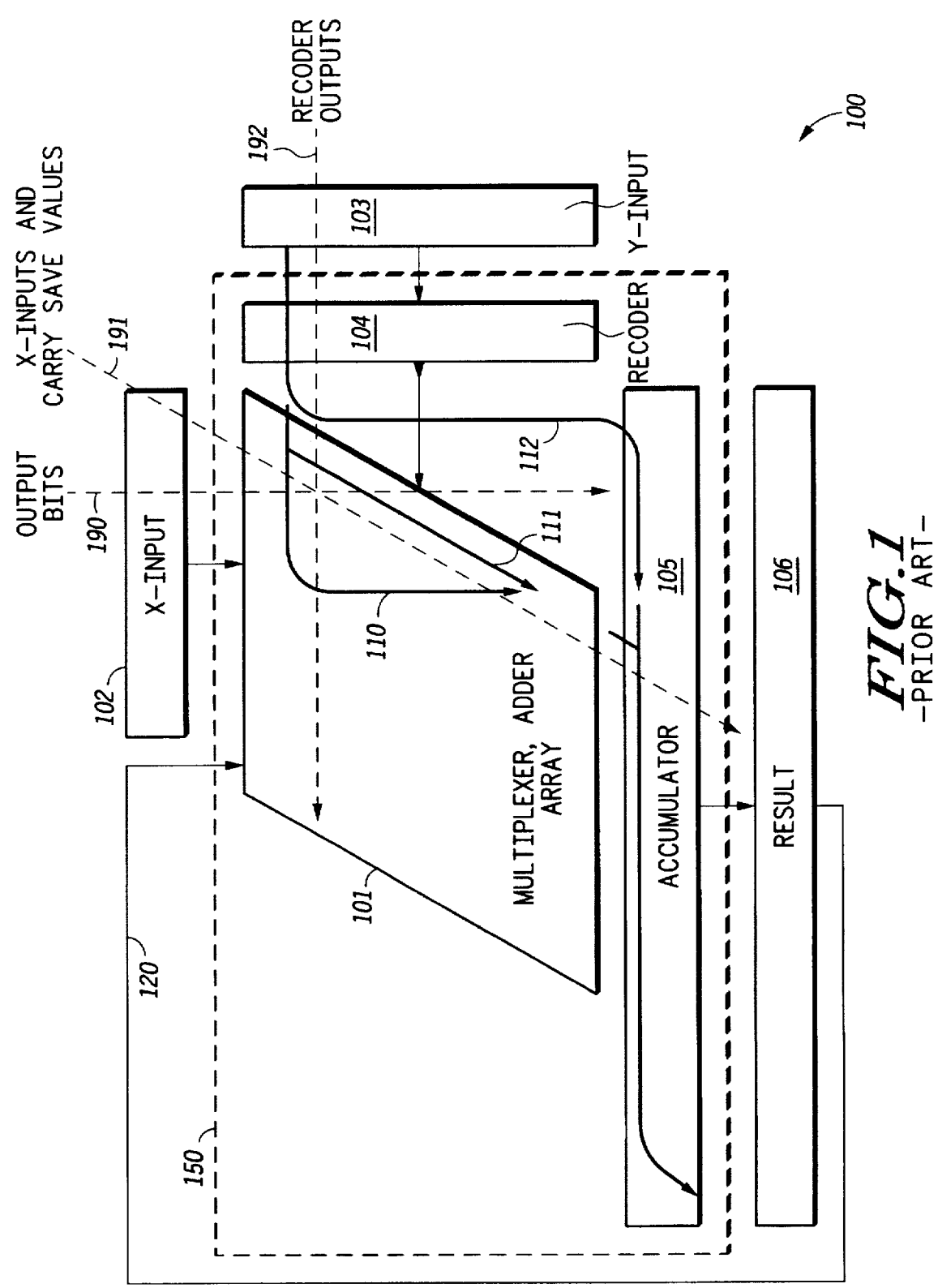
FIG. 1 illustrates a multiply/accumulate circuit.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
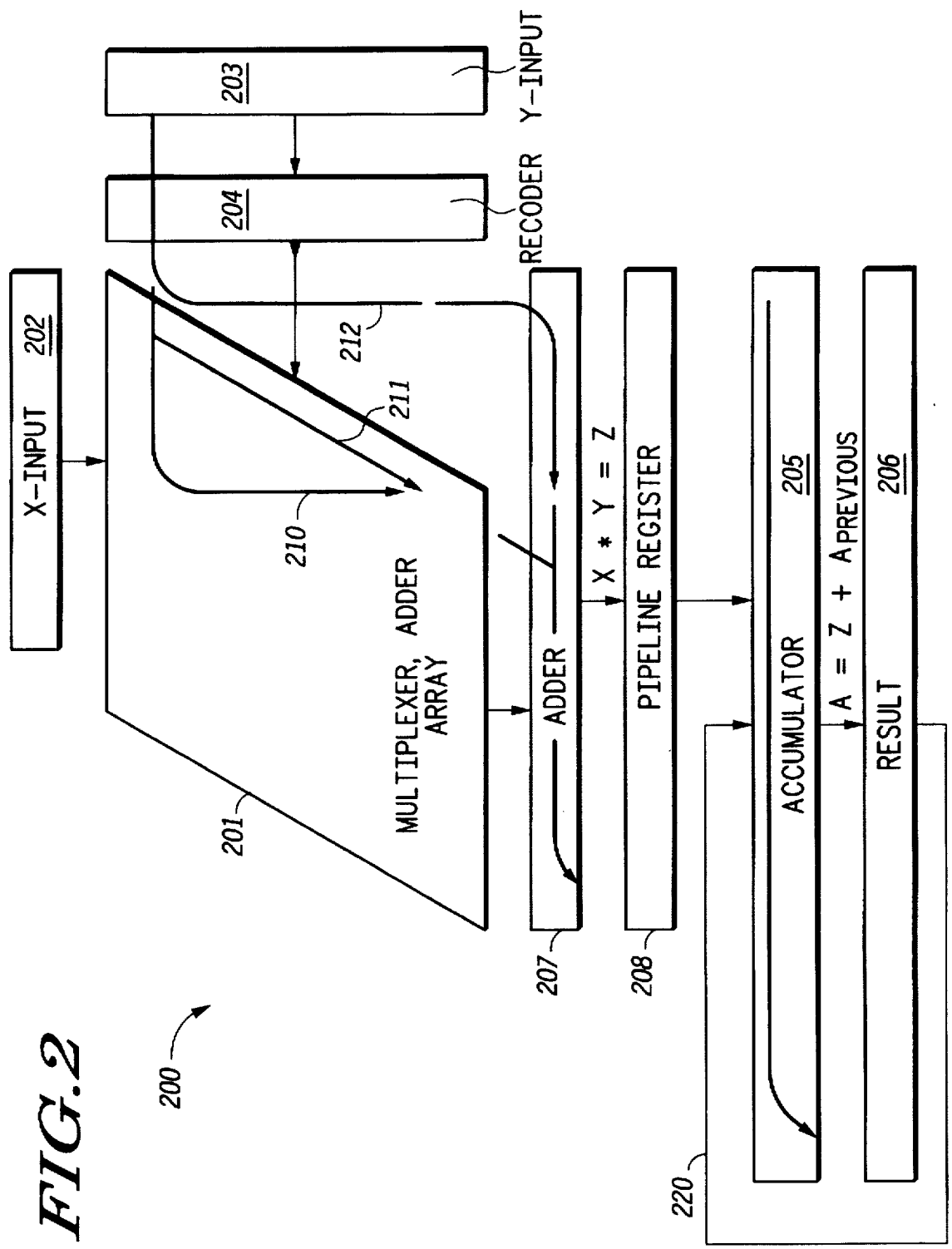
FIG. 2 illustrates a pipelined multiply/accumulate circuit.

Referring next to FIG. 2, there is illustrated one pipeline scheme used within a MAC implementing a modified Booth's algorithm. MAC 200 is similar to MAC 100 in that X-input latch 202, Y-input latch 203, recoder 204, multiplexer(mux)/adder array 201, accumulator 205, and result latch 206 are similar to those corresponding elements implemented within MAC 100. However, MAC 200 is modified to include adder 207 and pipeline register 208 between array 201 and accumulator 205. Adder 207 is included at the output of array 201 to collect carry values produced within mux/adder array 201.

A multiplexer/adder array typically uses "carry-save" adders, which are faster than "carry-propagate" adders. For such a carry-save adder array, there is a final adder near the output which resolves the plurality of "saved" carry bits with the plurality of "sum" bits into a plurality of sum bits with a single carry bit. In MAC 100, this function is combined with the accumulate function in final adder/accumulator 105. In MAC 200, this function is performed separately, since adder 207 is separated from accumulator 205 by pipeline register 208.

In MAC 200, the multiply function, $X*Y=Z$, is separated from the accumulate function, $A=Z+A_{PREVIOUS}$, by pipeline register 208. This architecture is used because only a single latch is used in accumulator feedback path 220. In contrast, if the output of result latch 206 is fed back to array 201, then two latches would be in this feedback loop. Feedback path 220 is not coupled to the input of array 201, but is instead coupled to the input of accumulator 205 from result latch 206. However, with such a configuration, an accumulator input at the input, or the top, of array 201 is not used.

Again, example gate-drain delay paths 210–212 are shown. The configuration of MAC 200 reduces the number of gate-drain delays within the longest path in MAC 200 relative to the longest gate-drain delay path within MAC 100. This reduction is due to the fact that delays within recoder 204 and accumulator 205 are now in parallel, and not in series. Recoder 204 is now in series with adder 207, which is faster than placing recoder 204 in series with accumulator 205. Since the delay in recoder 204 is small, the improvement in total delay is also small.

Figure 4:
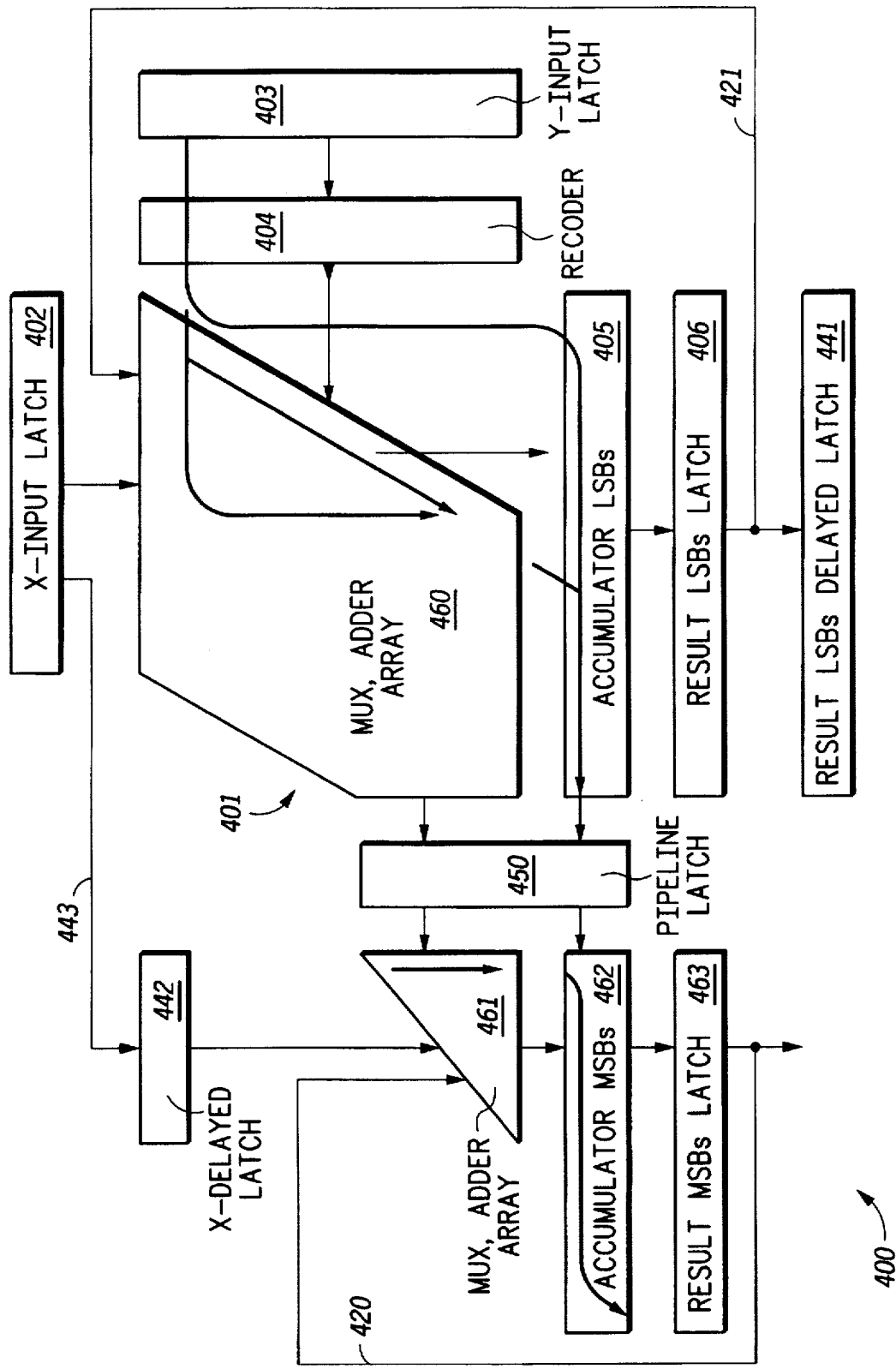
FIG. 4 illustrates another embodiment of the present invention.

Referring next to FIG. 4, there is illustrated one embodiment of the present invention. Y-input latch 403, recoder 404, and mux/adder array 401 operate in a manner similar to the operation of the corresponding elements described above with respect to FIGS. 1 and 2. However, the operation of array 401 has been divided into array portions 460 and 461. Furthermore, accumulators 405 and 462 operate in a manner similar to accumulator 205, except that the duties of the accumulator circuit have been divided into the two accumulator portions 405 and 462.

MAC 400 utilizes a vertical break in array 401 and the accumulator resulting in a "horizontal" pipeline. Horizontal pipeline latch 450 captures (1) all signals crossing the boundary from array portion 460 to array portion 461, which signals as noted above with respect to FIG. 1, comprise particular carry-save values and recoder outputs, which are being bussed across array 401, and (2) the carry propagation from accumulator portion 405 to accumulator portion 462.

X-input latch 402 is identical to latch 202. An additional X-delayed latch 442 is added to delay the most significant bits of the output of latch 402. X-delayed latch 442 is used to align in time the X-input data into array 461 with the recoded Y-input data that has been delayed by pipeline latch 450.

In MAC 400, a single clock delay is preserved in accumulator feedback paths 420 and 421, because path 420 or path 421 does not pass through pipeline latch 450.

The output of accumulator 405 is coupled to result latch 406.

Furthermore, results from accumulator 462 are passed to result latch 463. The two values within result latches 406 and 463 may be re-synchronized by result delay latch 441, which is coupled to the output of result latch 406.

In circuit 400, the least significant portion of the multiply-accumulate function operates in a different clock cycle than the most significant portion. In circuit 200, the multiply function operates in a different clock cycle than the accumulate function.

An advantage of circuit 400 is that it reduces the number of gate-drain delays significantly, thus allowing for a faster clock signal to be used in operating MAC 400. This is accomplished because the long serial path through the recoder followed by the accumulator has been broken by pipeline latch 450 closer to the path's midpoint; thus, the longest path length is reduced.

The location of pipeline latch 450 within array 401 may be varied as desired. Typically, the location of pipeline latch 450 is set to equalize the length of the longest path in the most significant portion with the longest path in the least significant portion of circuit 400. Recall that the least significant portion of circuit 400 passes through array 460 and accumulator 405, while the most significant portion of circuit 400 passes from latch 442 through array 461 and accumulator 462.

Circuit 400 is an example of an implementation of the horizontal pipeline within a multiply-accumulate circuit using the modified Booth's algorithm. The horizontal pipeline can be similarly utilized in a multiply only circuit without accumulate, or in a multiplier only or MAC that does not use the modified Booth's algorithm. Two of these options are illustrated in FIG. 3.

Figure 3:
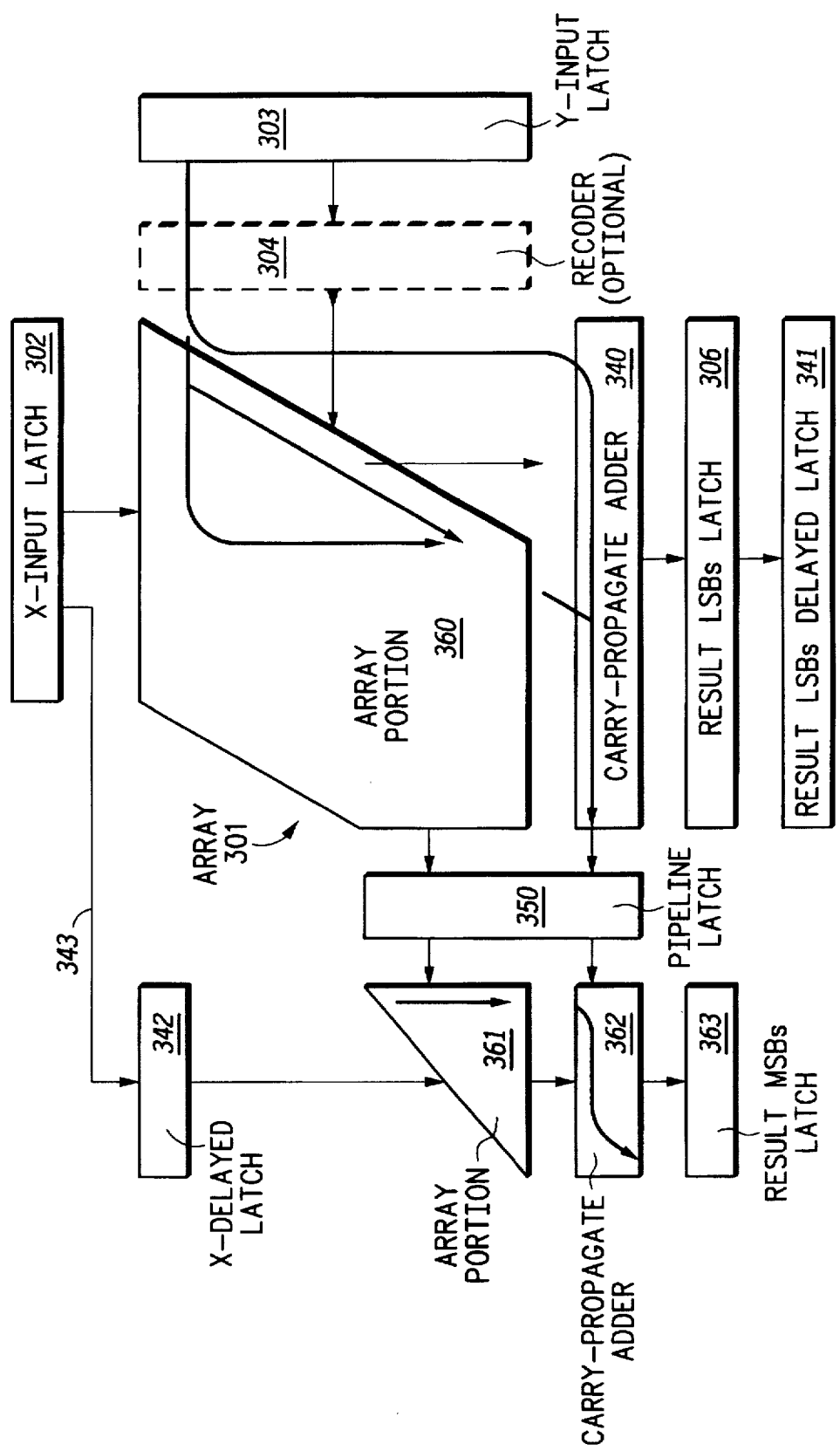
FIG. 3 illustrates one embodiment of the present invention.

Referring next to FIG. 3, there is illustrated multiplier 300, which is a multiplier only and not a multiply-accumulate circuit. Accumulators have been replaced with carry-propagate adders 340 and 362, and recoder 304 is shown as being optional, depending on whether or not multiplier 300 implements a modified Booth's algorithm. Furthermore, Y-input latch 303, X-input latch 302, X delayed latch 342, array portion 360, pipeline latch 350, and array portion 361 operate similar to corresponding elements Y-input latch 403, X-input latch 402, X delayed latch 442, array portion 460, pipeline latch 450, and array portion 461 of MAC 400. However, since an accumulate function is not needed, feedback portions 420 and 421 have been removed.

Multiplier 300 represents a more general multiplier, not necessarily implementing a modified Booth's algorithm.

Nevertheless, multiplier 300 employs the same advantages with respect to the gate-drain delay parameters as MAC 400 in that pipeline latch 350 operates similarly to pipeline latch 450.

Figure 6:
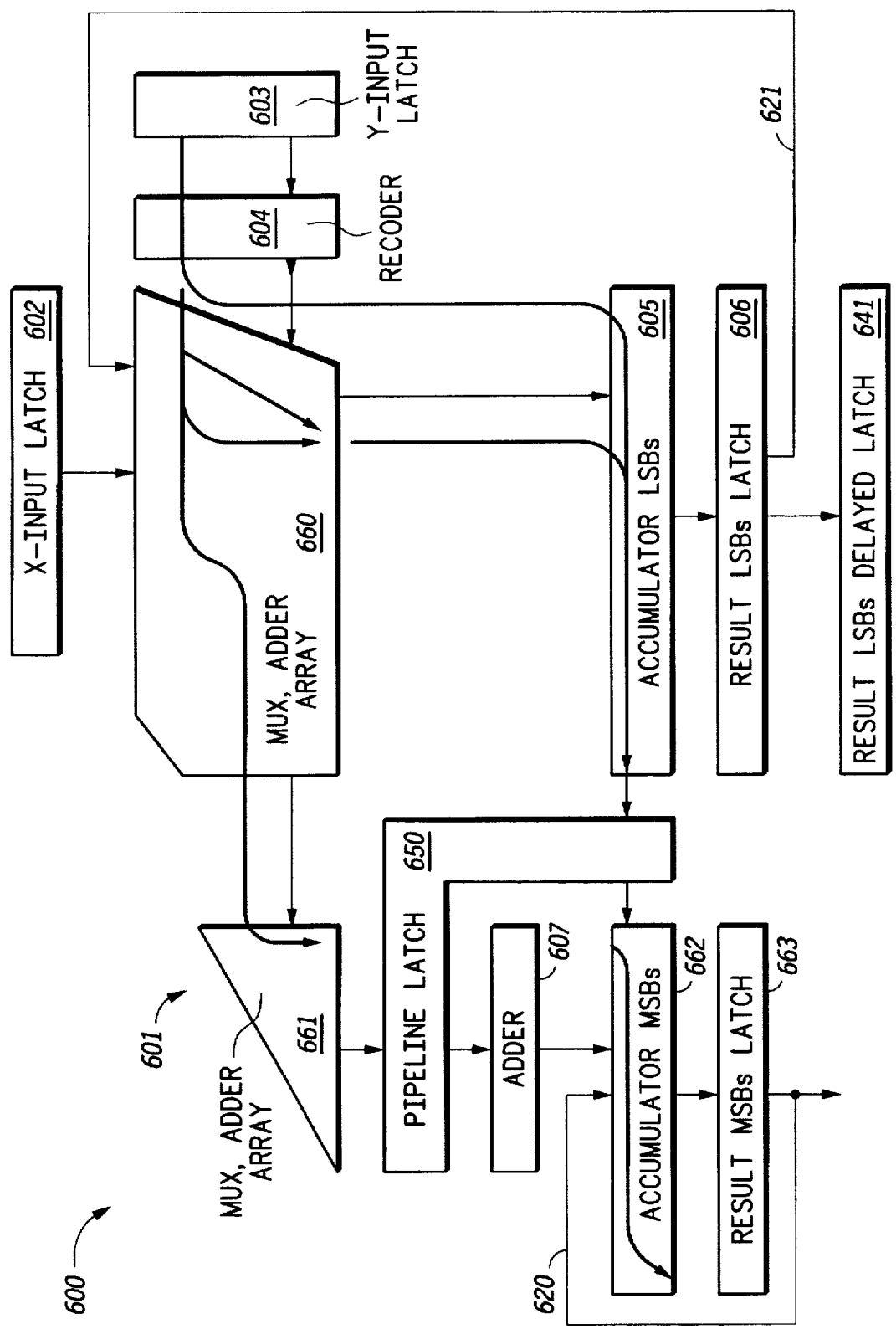
FIG. 6 illustrates another embodiment of the present invention.

Referring next to FIG. 6, there is illustrated another alternative embodiment of the present invention, which utilizes vertical and horizontal pipeline latches. MAC 600 is similar to MAC 400 except that there is no analog to X-delayed latch 442; X-input latch 602 is instead similar to X-input latch 202 of MAC 200. Furthermore, MAC 600 includes pipeline latch 650. This is an extended version of latch 450 and has both a vertical and a horizontal component.

Multiplexer-adder array 601 is identical to array 401. It is shown as separate parts 660 and 661 to maintain data alignment with the accumulator which has been divided into two portions, 605 and 662. Pipeline latch 650 consists of both horizontal and vertical components and separates the most significant portion 662 of the accumulator from portion 605. Similar to adder 207 described previously, adder 607 is required to resolve the interim sum and plurality of saved carry signals from mux/adder array 601 into a final output and single carry signal. Adder 607 can be placed on either side of pipeline latch 650. When adder 607 is configured as shown in FIG. 6, MAC 600 is usually slightly faster, but when adder 607 is placed above pipeline latch 650, MAC 600 is significantly smaller. This is because approximately half the number of signals would have to be latched in this case.

As can be seen by the dissimilarity of the implementation of accumulator feedback signals 621 and 620, accumulator portions 605 and 662 operate differently. This is because only a single latch is allowed in an accumulator feedback path. Portion 605 uses feedback path 621 which is similar to path 120 of MAC 100. This is a more efficient circuit implementation, but it is not used with respect to portion 662 because the resultant feedback loop would include both result latch 663 and pipeline latch 650. Furthermore, feedback path 620 is similar to feedback path 220 in MAC 200.

MAC 600 incorporates an efficient pipeline to MAC 100 because not only are the delay paths equalized on each side of pipeline latch 650, but the number of gate-drain delays in each of these paths is approximately half the number of gate drain delays in the longest path of MAC 100.

Circuit 600 is an example of an implementation of the combination horizontal-vertical pipeline within a multiply-accumulate circuit using the modified Booth's algorithm. The combination horizontal-vertical pipeline can be similarly utilized in a multiply only circuit without accumulate or in a multiplier only or a MAC that does not use the modified Booth's algorithm. Two of these options are illustrated in FIG. 5.

Figure 5:
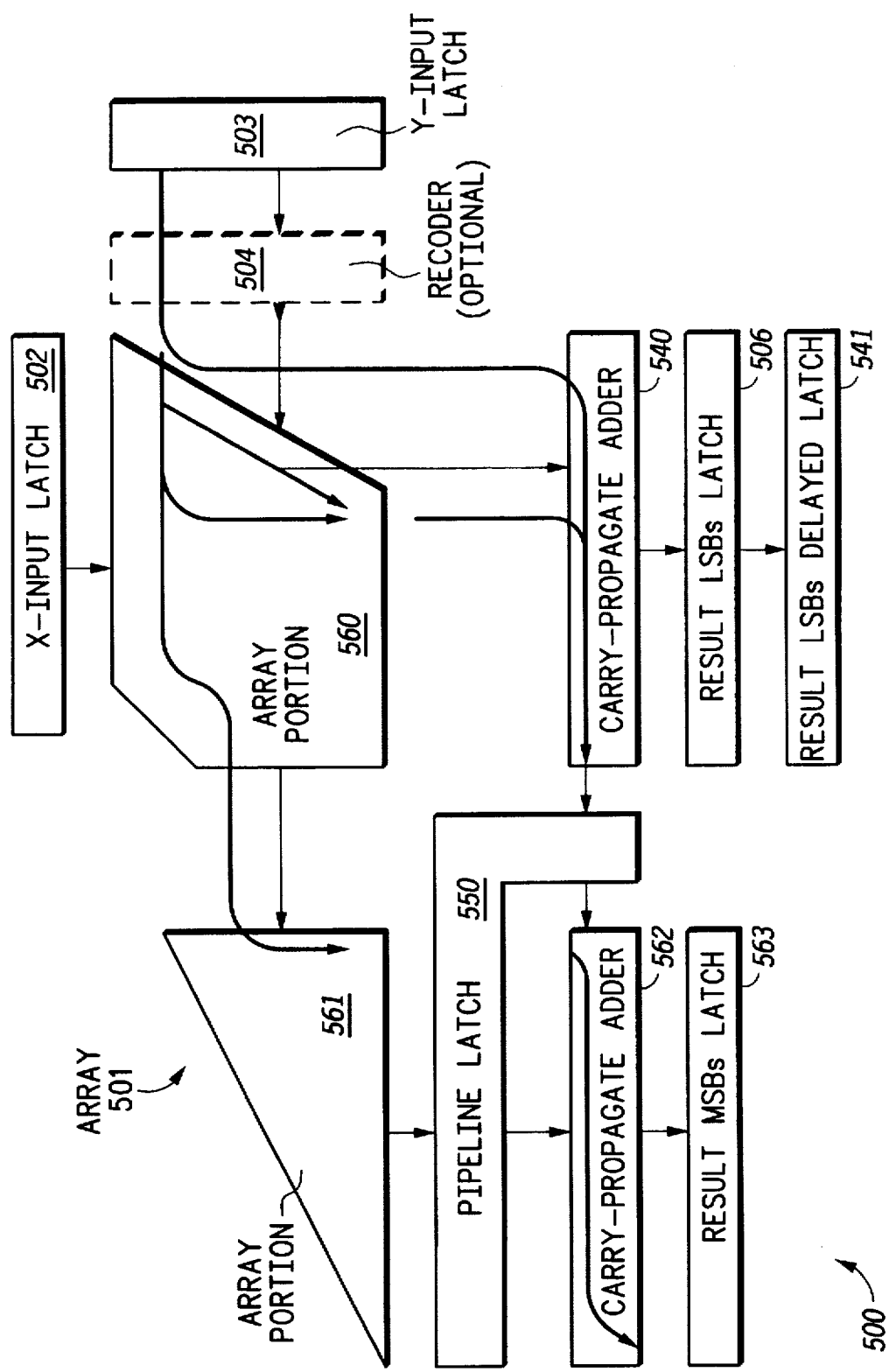
FIG. 5 illustrates another embodiment of the present invention.

Referring next to FIG. 5, there is illustrated multiplier circuit 500, which is similar to MAC 600, except that adder 607 has been removed, and accumulator portions 605 and 662 have been replaced with carry-propagate adders 540 and 562, respectively. Furthermore, recoder 504 is optional depending on whether or not multiplier circuit 500 implements a modified Booth's algorithm. Nevertheless, the advantages of MAC 600 are also included within multiplier circuit 500 in that multiplier circuit 500 has reduced gate-drain delay paths, therefore permitting multiplier circuit 500 to operate with a faster clock signal.

Figure 7:
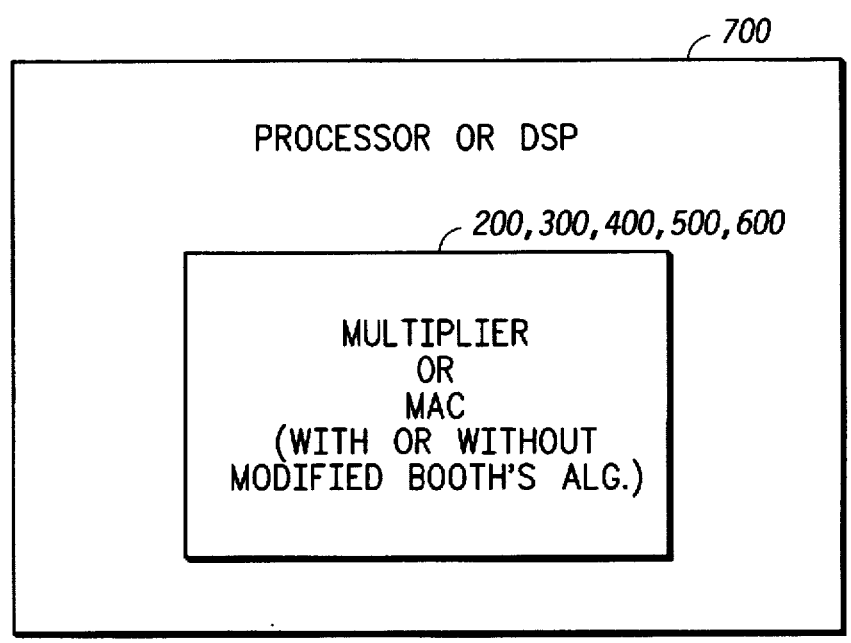
FIG. 7 illustrates an implementation of the present invention in a processor or DSP.

Referring next to FIG. 7, there is illustrated, in block diagram form, processor or DSP 700, which includes any one of circuits 200, 300, 400, 500, or 600 discussed above.

This illustrates that the multiplier or MAC circuits (with or without an implementation of modified Booth's algorithm) may be used within a microprocessor or a DSP.

Although the present invention and its advantages have been described in detail, it should be understood that various changes, substitutions and alterations can be made herein without departing from the spirit and scope of the invention as defined by the appended claims.

I claim:

1. A multiplier circuit operable for multiplying an N-bit first operand and an M-bit second operand, comprising:

a partial product array for summing partial products and generating an array output representative of an (N+M)-bit product of said first and second operands, wherein a first portion of said partial product array generates first outputs representing an X least significant bits of said array output, wherein X is less than N+M, and wherein a second portion of said partial product array generates second outputs representing an N+M−X most significant bits of said array output;

circuitry for combining into a final product result said first outputs representative of said X least significant bits of said array output and said second outputs representative of said N+M most significant bits of said array output; and circuitry for horizontally pipelining said first and second portions of said partial product array.

2. The multiplier circuit as recited in claim 1, wherein said combining circuitry comprises:

first circuitry, coupled to said first portion of said partial product array, for combining said first results into said X least significant bits of said array output; and second circuitry, coupled to said second portion of said partial product array, for combining said second results into said N+M−X most significant bits of said array output.

3. The multiplier circuit as recited in claim 2, wherein said first and second combining circuitry operate at independent clock cyles of each other.

4. The multiplier circuit as recited in claim 1, further comprising:

a first input latch, coupled to said first portion of said partial product array, for inputting to said first portion of said partial product array said N-bit first operand; and a second input latch, coupled to said second portion of said partial product array, for inputting to said second portion of said partial product array said most significant bits of said N-bit first operand.

5. The multiplier circuit as recited in claim 1, wherein said multiplier is implemented within a digital signal processor.

6. The multiplier circuit as recited in claim 1, wherein said multiplier circuit implements a modified Booth's algorithm.

7. The multiplier circuit as recited in claim 6, further comprising:

a first input latch for receiving and inputting to said partial product array said N-bit first operand;

a second input latch for receiving said M-bit second operand; and a recoder, coupled between said second input latch and said partial product array, for receiving and inputting said M-bit second operand into said partial product array.

8. The multiplier circuit as recited in claim 1, wherein said pipelining circuitry further comprises a pipeline latch coupling said first and second portions of said partial product array.

9. The multiplier circuit as recited in claim 8, wherein said pipeline latch transfers carry-save and recoder outputs from said first portion to said second portion of said partial product array.

10. The multiplier circuit as recited in claim 1, further comprising:

a first input latch, coupled to said first portion of said partial product array, for inputting to said first portion of said partial product array said N-bit first operand;

a second input latch, coupled to said second portion of said partial product array, for inputting to said second portion of said partial product array said most significant bits of said N-bit first operand;

a first accumulator and results latch, coupled to said first portion of said partial product array, for combining said first results into said X least significant bits of said array output;

a second accumulator and results latch, coupled to said second portion of said partial product array, for combining said second results into said N+M−X most significant bits of said array output plus any accumulator overflow bits, wherein said first and second accumulators operate independently of each other; and a pipeline latch coupling said first and second portions of said partial product array.

11. The multiplier circuit as recited in claim 10, wherein said pipeline latch couples said first accumulator to said second accumulator.

12. The multiplier circuit as recited in claim 1, wherein said combining circuitry comprises:

a first accumulator and results latch coupled to an output of said first portion;

a first set of one or more pipeline latches coupled to an output of said second portion;

a second accumulator and results latch coupled to an output of said first set of one or more pipeline latches; and a second set of one or more pipeline latches coupling said first and second accumulators.

13. A multiplier implementing a modified Booth's algorithm comprising:

a mux/adder array comprising first and second portions;

first circuitry, coupled to said mux/adder array, for inputting an N-bit multiplicand into said mux/adder array;

second circuitry, coupled to said mux/adder array, for inputting an M-bit multiplier into said mux/adder array;

third circuitry, coupled to said mux/adder array, for outputting a product of said multiplier and said multiplicand, wherein said first portion of said mux/adder array outputs a representation of an X least significant bits of said product, and wherein said second portion of said mux/adder array outputs a representation of an N+M−X most significant bits of said product, wherein X is a positive integer less than N+M; and fourth circuitry for pipelining carry/save output values from said first portion to said second portion, wherein operation of said second portion is delayed with respect to operation of said first portion.

14. The multiplier as recited in claim 13, wherein said first circuitry comprises:

a first latch, coupled to said first portion, for inputting said N-bit multiplicand into said first portion; and a second latch, coupled to said second portion, for inputting most significant bits of said N-bit multiplicand into said second portion, wherein a value stored in said second latch is delayed relative to a value stored in said first latch.

15. The multiplier as recited in claim 13, wherein said third circuitry comprises:

a first accumulator coupled to an output of said first portion;

a second accumulator coupled to an output of said second portion; and at least one latch coupling said first and second accumulators.

16. The multiplier as recited in claim 15, wherein said third circuitry comprises:

a first results latch coupled to an output of said first accumulator;

a second results latch coupled to an output of said second accumulator; and a delayed results latch coupled to an output of said first results latch.

17. The multiplier as recited in claim 13, wherein said second circuitry includes a recoder, and wherein said fourth circuitry pipelines certain outputs of said recoder to said second portion.

18. A multiplier comprising:

a mux/adder array comprising first and second portions;

first circuitry, coupled to said mux/adder array, for inputting an N-bit multiplicand into said mux/adder array;

second circuitry, coupled to said mux/adder array, for inputting an M-bit multiplier into said mux/adder array; and third circuitry, coupled to said mux/adder array, for outputting a product of said multiplier and said multiplicand, wherein said first portion of said mux/adder array generates an output representative of an X least significant bits of said product, and wherein said second portion of said mux/adder array generates an output representative of an N+M−X most significant bits of said product, wherein X is a positive integer less than N+M, wherein said third circuitry comprises:

at least one pipeline latch coupled to an output of said second portion; and an adder, coupled to an output of said at least one pipeline latch, for collecting carry values produced in said second portion, wherein said second accumulator is coupled to an output of said adder.

19. The multiplier as recited in claim 18, further comprising fourth circuitry for pipelining at least one value from said first accumulator to said second accumulator, wherein values within said second accumulator are delayed with respect to values within said first accumulator.

20. The multiplier as recited in claim 19, wherein said multiplier implements a modified Booth's algorithm.

* * * * *